Patented July 7, 1936

2,046,324

UNITED STATES PATENT OFFICE 2,046,324

SALTS OF ESTERS OF PARA- HYDROXYBENZOIC ACID

William H. Engels and John Weijlard, Rahway, N. J., assignors to Merck & Co., Inc., Rahway, N. J., a corporation of New Jersey No Drawing. Application June 17, 1933, Serial No. 676,322

8 Claims. (Cl. 260—104)

The present invention relates to the production of salts of esters of para-hydroxybenzoic acid useful for preserving foods and beverages and as antiseptics. The general object is to provide a series of such compounds having superior physical and chemical properties which adapt them for food preservatives, especially in solutions of a neutral or alkaline character. A further object is to provide such salts in the form of dry, non-hygroscopic powders, which renders them more efficient for practical industrial employment. Further objects and applications will become apparent from the further disclosures herein.

Sodium benzoate has long been employed as a chemical preservative agent for food-stuffs, but its use has been limited due to its ineffectiveness in neutral or alkaline media. It has been established, however, that esters of para-hydroxybenzoic acid, while being relatively non-toxic, exert powerful inhibiting action against bacteria, fungi, etc., even in neutral and alkaline solutions, and the use of such esters has been highly recommended for the requirements of the food industry, where sodium benzoate had become worthless on account of the neutral or alkaline reaction of the media.

The esters of para-hydroxybenzoic acid, as far as their usefulness in the industries is concerned, have one common fault, namely their low and slow rate of solubility in water. These esters, however, readily dissolve in solutions of the alkali metal hydroxides forming solutions of the phenolic sodium salts of the esters. It has been attempted to form these salts also in the dry state for ease of distribution and application. However, the extremely hygroscopic nature of these alkali metal salts has prevented their manufacture in the pure state; and, therefore, the alkali metal salts of such esters found on the market are really mixtures of powdered sodium hydroxide and the esters, particularly the methyl and propyl esters, as can easily be demonstrated by treating these mixtures with anhydrous ether, by which only the esters are dissolved, the alkali metal hydroxide remaining behind. It is evident that such mixtures can not remain stable very long in the presence of moist air or carbon dioxide. A further drawback of such mixtures of alkali metal hydroxide and the named esters, is that the esters themselves will dissolve in water or in aqueous media only when used in relatively high concentrations of the hydroxide-ester mixture. When the mixtures are used in solutions of sufficiently low concentrations to which they must be limited, when employed in a practical way for the inhibition of the growth of bacteria or fungi in food-stuffs, the alkali metal hydroxide dissolves out rapidly and the pH of the solution which results, comprising the hydroxide in water, is not sufficiently alkaline to freely dissolve the ester in effective amount. In such weakly alkaline hydroxide solutions the esters do not go into solution any faster than they would if only pure water were used. In order to get sufficient inhibiting effect from the esters contained in such mixtures the amount thereof necessary to be used would go beyond permissible limits.

It has now been found by us that, while the alkali metal salts are too unstable for commercial production because of their hygroscopicity, the alkaline earth metal salts form dry nonhygroscopic powders and are thus available for convenient commercial production and use, and they have been found to be generally sufficiently soluble to serve as efficient chemical agents to prevent fermentation.

For practical application, the salts of calcium and magnesium have been found to be the most convenient, economical and efficient. Among the esters of para-hydroxybenzoic acid which have been found especially efficient as preservatives are the ethyl, n-propyl, isopropyl, n-butyl, iso-butyl, iso-amyl and benzyl esters.

The calcium and magnesium salts of this group of esters form white, crystalline, nonhydroscopic powders. Of these new salts, those formed of the n-butyl and ethyl esters appear to be preeminently adaptable for the purposes of their principal intended use on account of their relatively lower toxicity, relatively greater efficiency and ample solubility.

Thus the water solubility of the calcium salt of n-butyl-para-hydroxybenzoic acid is about 1:125, that of the magnesium salt is about 1:110, whereas the approximate amounts necessary for preservative use is about 1 part in 2000, more or less, according to the medium with which they are to be incorporated.

The barium and strontium salts of the esters can also be prepared and behave in a similar way. These, of course, on account of the toxic properties of the barium and strontium salts, should not be used in the food industries. But, in other fields of the technical industries, they will find special applications, and they should, therefore, be considered equivalents of the calcium and magnesium salts for the purposes of this invention.

Convenient and preferred methods of making the various alkali-earth metal salts of the esters of para-hydroxybenzoic acids contemplated herein are set forth by way of illustration. Obviously, various of the several steps described may be modified as to quantitative relations, temperature, strength of solutions, etc., within practical limits, without departing from the scope and spirit of the present invention.

*Example I.*—5 kg. para-hydroxybenzoic acid normal butyl ester are dissolved in 20 liters of water containing 1.03 kg. sodium hydroxide. To this is added a solution of 1.43 kg. anhydrous calcium chloride in 10 liters of water. After mixing, the batch is allowed to stand at room temperature for 24 hours. The calcium salt of the para-hydroxybenzoic acid butyl ester is filtered off, washed and dried at 60 to 70° C. in the usual manner. About 5.15 kg. of the dry salt is obtained.

*Example II.*—5 kg. para-hydroxybenzoic acid benzyl ester are dissolved in 25 liters of water containing 0.88 kg. sodium hydroxide. To this is added a solution containing 2.70 kg. of $$MgSO_4.7H_2O$$

in 10 liters of water. After mixing, the batch is allowed to stand over night. The magnesium salt of para-hydroxybenzoic acid benzyl ester is filtered off, washed and dried at 60 to 70° C. in the usual manner. The yield is approximately 4.88 kg.

From the examples set forth above by way of illustration, the chemist skilled in the art may readily produce the analogous calcium, magnesium and other alkaline earth metal salts of any desired alkyl or aryl esters of para-hydroxybenzoic acid of the types described above, by appropriately adapting the quantitative relations stoichiometrically.

We claim as new:
1. Calcium salts of alkyl esters of para-hydroxybenzoic acid forming white, non-hygroscopic crystalline powders moderately soluble in water and stably soluble in solutions of neutral and alkaline reaction.
2. Magnesium salts of alkyl esters of para-hydroxybenzoic acid, forming white, non-hygroscopic crystalline powders moderately soluble in water and stably soluble in solution of neutral and alkaline reaction.
3. Alkali-earth metal salts of alkyl esters of para-hydroxybenzoic acid, forming white, non-hygroscopic crystalline powders moderately soluble in water and stably soluble in solutions of neutral and alkaline reaction.
4. Alkali-earth metal salts of para-hydroxybenzoic acid butyl ester, forming white, non-hygroscopic crystalline powders moderately soluble in water and stably soluble in solutions of neutral and alkaline reaction.
5. Alkali-earth metal salts of para-hydroxybenzoic acid iso-butyl ester, forming white, non-hygroscopic crystalline powders moderately soluble in water and stably soluble in solutions of neutral and alkaline reaction.
6. Alkali-earth metal salts of para-hydroxybenzoic acid n-butyl ester, forming white, non-hygroscopic crystalline powders moderately soluble in water and stably soluble in solutions of neutral and alkaline reaction.
7. Calcium salt of p-hydroxybenzoic acid n-butyl ester in the form of a white crystalline dry powder, soluble in about 125 parts of water, and stably soluble in neutral and alkaline media.
8. Magnesium salt of p-hydroxybenzoic acid n-butyl ester in the form of a white crystalline dry powder, soluble in about 110 parts of water, and stably soluble in neutral and alkaline solutions.

WILLIAM H. ENGELS.
JOHN WEIJLARD.